Feb. 28, 1939.  C. C. FARMER  2,148,737
INSECT EXCLUDER
Filed Oct. 27, 1937
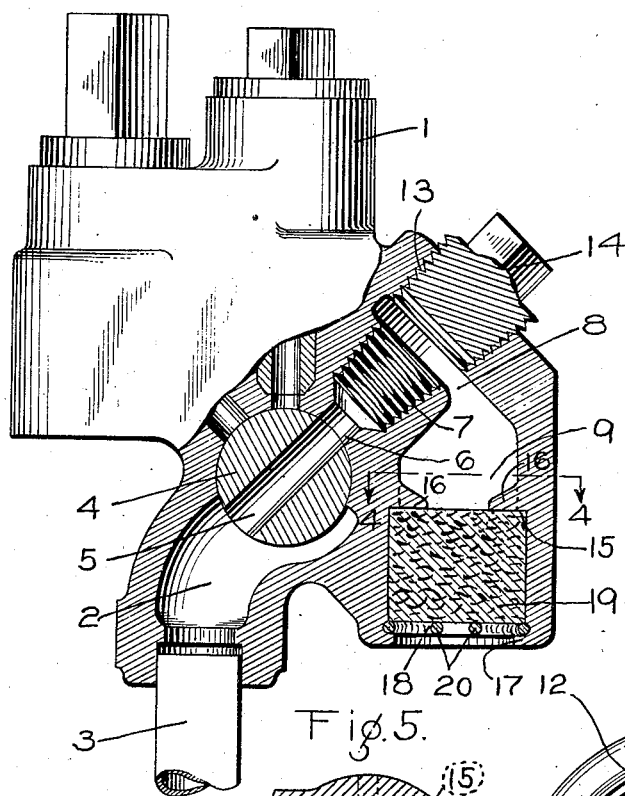
INVENTOR
CLYDE C. FARMER
BY Wm. M. Cady
ATTORNEY Patented Feb. 28, 1939

2,148,737

UNITED STATES PATENT OFFICE 2,148,737

INSECT EXCLUDER

Clyde C. Farmer, Pittsburgh, Pa., assignor to The Westinghouse Air Brake Company, Wilmerding, Pa., a corporation of Pennsylvania Application October 27, 1937, Serial No. 171,318

7 Claims. (Cl. 303—1)

This invention relates to fluid pressure equipment, such as fluid pressure brake equipment for railway vehicles, and more particularly to control valve devices thereof having certain control passages which are open to the atmosphere, an example of such a device being the pressure retaining valve device employed on railway cars for controlling the release of fluid under pressure from the brake cylinders on the cars.

The usual retaining valve device is provided with vent passages of relatively small diameter which lead to an atmospheric exhaust cavity or passage of greater diameter for the reception of the pipe stud of a pressure gauge when it is desired to make certain leakage tests, which pipe plug is adapted to have screw threaded connection with that portion of the casing of the device which defines the exhaust passage.

Insects, such as mud wasps, in search of a place to make a nest, are prone to enter the retaining valve device by way of the large open atmospheric exhaust passage in the retaining valve device and from thence travel on into the vent passages of smaller diameter and there make their nests of mud, the atmospheric exhaust passage apparently being too great in diameter and therefore too conspicuous for this purpose. These nests either seal up the vent passages and thereby prevent the release of the brakes or so clog the passages as to seriously interfere with the release of the brakes.

One object of my invention is to provide a novel insect excluding arrangement which is adapted to be interposed in certain control passages of fluid pressure equipments.

Various insect excluding devices have heretofore been proposed for preventing the entrance of the insects into the control passages of control valve devices in order to avoid the above mentioned difficulties. In most cases these excluders are made of brass and are therefore expensive and are also liable to be stolen. In some installations the excluder is so arranged that it is substantially wholly on the exterior of the casing of the control valve device where it is liable to become broken or damaged from external blows or from the use of a tool such as a pipe wrench or other tool employed to apply or remove the excluder from the casing of the device.

Another object of the invention is to provide an insect excluder arrangement which will be of simple construction and cheap to manufacture and in which the excluder will be contained wholly within the body of the valve device, where it will not be subject to breakage or damage or other objectionable features above enumerated.

Another object of the invention is to provide an insect excluder for control passages of a fluid pressure equipment of a mass of compacted material which is pervious to air.

According to this object the material from which the excluder is made may be curler hair, fiber, metal wool, glass wool or any other material which when compacted will be pervious to air and yet prevent the passage of insects therethrough.

Other objects and advantages will be apparent from the following more detailed description of the invention.

In the accompanying drawing Fig. 1 is an elevational view, partly in section, of a pressure retaining valve device embodying the invention; Fig. 2 is an enlarged plan view of a snap ring for maintaining the insect excluder in place in the retaining valve device; Fig. 3 is a fragmentary sectional view which is similar to a portion of Fig. 1 but showing a test gauge applied to the device; Fig. 4 is a fragmentary sectional view taken on the line 4—4 of Fig. 1 showing one form of means for insuring the proper positioning of the excluder in the device; and Figs. 5 and 6 are sectional views corresponding to Fig. 4 but each illustrating another form of positioning means for the excluder.

As shown in the drawing the insect excluder arrangement is embodied in a fluid pressure brake pressure retaining valve device of the high and low pressure type but it is to be understood that it may be embodied in other control valve devices where it is desired to exclude insects from passages which are open to the atmosphere.

As shown, the pressure retaining valve device may comprise a casing or body I having an inlet chamber 2 formed in the lower portion thereof which is connected to an exhaust pipe 3 leading from the usual brake cylinder exhaust passage of a triple valve device (not shown) or of any other type of brake controlling valve device.

Rotatably mounted in the body I is the usual plug valve 4 which is provided with a port 5 which at one end is in constant open communication with the chamber 2 and which as is well known is adapted to establish communication from the chamber 2 to either the high or the low pressure portion or to provide direct release of the brakes according to the degree of rotation of the plug valve.

The plug valve 4 is shown in the usual direct release position in which the port 5 establishes communication from the chamber 2 to a vent passage 6 which is connected through a screw-threaded bore 7 and a passage 8 to the inner end of a relatively large chamber or cavity 9, which chamber or cavity is open at its outer end to the atmosphere. It will be understood that when a direct release of the brakes is being effected fluid under pressure is vented from the brake cylinder to the atmosphere by way of the exhaust communication just traced.

The screw-threads in the bore 7 are of the tapered type commonly employed in pipe connections and provide for the attachment of the screw-threaded portion 10 of the nipple 11 of a test gauge 12, as shown in Fig. 3, when it is desired to make the usual brake cylinder leakage tests. In order to facilitate the use of the test gauge, the body 1 is provided with a screw-threaded bore 13 which extends in longitudinal alignment with the bore 7 and passage 6 from the exterior of the body to the passage 8, which bore 13 is normally closed by means of a plug 14 which has screw-threaded connection with the body 1. The diameter of the bore 13 is greater than that of the screw-threaded portion 10 of the test gauge so as to permit the free passage of this portion 10 to the screw-threaded bore 7 when the plug 14 is removed.

The exhaust chamber or cavity 9 of the body 1, near its upper end is reduced in diameter to form an annular shoulder 15 and above this shoulder and extending laterally from opposite sides of the chamber are lugs 16, the lower surfaces of which lugs are flush with the shoulder 15.

The lower end of the exhaust chamber or cavity 9 is reduced in diameter to form an annular shoulder 17 which as will hereinafter more fully appear is adapted to support a snap ring 18.

Packed in the chamber 9 below the shoulder 15 and lugs 16 and engaged by the shoulder and lugs is a mass of stranded material 19 which fills that portion of the chamber which is between the shoulders 15 and 17. It should here be mentioned that the shoulder 15 and lugs 16 serve to so limit the packing space in the chamber 9 that the same amount of stranded material may be apportioned for each retaining valve device, thus ensuring against the use of excessive material and further ensuring the desired density of the compacted mass. The shoulder 15 and lugs 16 also serve to prevent the stranded material from being packed into the passage 8 where it would interfere with the attachment of the screw-threaded portion 10 of the test gauge nipple.

Contained in the chamber 9 and carried by the shoulder 17 is the snap ring 18. In the present embodiment of the invention the ends of this ring are shown bent to form spaced parallel tines 20 which extend in a direction across the space defined by the major portion of the ring, which tines serve to maintain the material 19 against loss through the lower or open end of the chamber. To place the ring in its proper position it is first contracted and passed through the open end of the chamber to the packing space and finally permitted to expand so as to interlock with the shoulder 17.

This compacted material forms an insect excluder which while being pervious to air will prevent insects from entering chamber 9, and the exhaust communication leading thereto.

The stranded material 19 may be curled hair, fiber, metal wool, glass wool or any other material which when compacted is pervious to air.

Instead of packing the stranded material in the chamber 9 as just described it may be preformed so as to constitute a unitary element or cartridge which may be placed in position through the open end of the chamber. When the element is of the pre-formed type it will be made of such a diameter that when it is forced past the shoulder 17 it will expand into close contact with the inner surface of the chamber so as to insure against there being any open spaces between the element and surface of the wall through which insects may enter the chamber 9.

When the brakes are being released the exhaust flow of fluid from the brake cylinder by way of the pipe 3 may carry rust and scale into the exhaust communication of the retaining valve device, and since the diameter of certain types of insect excluders heretofore employed is small and the exhaust grooves or passages therein must necessarily be small enough to exclude insects there is danger of these grooves or passages becoming clogged by the rust or scale carried by the exhaust air. Any such clogging either interferes with or prevents the release of the brakes. To eliminate this difficultly I contemplate making the exhaust cavity 9 of comparatively large diameter as shown so that the surface of the mass of straining material which will be subjected to the exhaust air will be of sufficient area to preclude clogging by rust and scale over a long period of time.

Instead of employing lugs 16 to assist in limiting the packing space in the chamber 9 a pin 21 may be provided which passes across the chamber 9 and which may be cast in the body 1 as shown in Fig. 5.

In Fig. 6 another form of the packing space limiting means for the chamber 9 is shown. This means comprises spaced parallel members 22 which extend across the chamber 9 and which are preferably integral with the body 1. When this means is used the shoulder 15 shown in Figs. 1, 4 and 5 may be omitted since the members 22 will of themselves limit the packing space.

While several illustrative embodiments of the invention have been described in detail, it is not my intention to limit its scope to these embodiments or otherwise than by the terms of the appended claims.

Having now described my invention, what I claim as new and desire to secure by Letters Patent, is:

1. In a fluid pressure brake, a valve device therefor having a fluid pressure exhaust passage and also having an exhaust cavity of large flow area connecting the exhaust passage to the atmosphere, and a mass of material pervious to air disposed in said cavity for preventing the entrance of insects to said passage, the inner end of the material being of substantially the same area as the flow area of the cavity so as to present a large surface to exhaust air from said passage and thereby lessen the tendency of the material becoming clogged with scale or other foreign matter which may be carried to the cavity by the air, and the outer end of the material being located close to the open atmospheric end of the cavity and being of substantially the same area as the flow area of the cavity to present a large surface to the atmosphere to lessen the tendency of clogging the material from the interior of the valve device.

2. In a fluid pressure brake, a valve device therefor of the type having an exhaust passage and a cavity of larger flow area than that of the passage and connecting the passage to the atmosphere and which is attractive to nest building insects, a mass of material pervious to air disposed in said cavity for preventing the entrance of insects to said passage, the inner end of said mass of material being spaced away from the mouth of said passage so as to present a large dirt collecting area to air flowing from the mouth of the passage to the cavity, and the outer end of said mass of material being located close to the open atmospheric end of the cavity presenting a large exterior surface which will be unattractive to nest building insects.

3. In a fluid pressure brake, a valve device therefor of the type having an exhaust passage and a cavity of larger flow area than that of the passage and connecting the passage to the atmosphere and which is attractive to nest building insects, a mass of material pervious to air disposed in said cavity for preventing the entrance of insects to said passage, the inner end of said mass of material being spaced away from the mouth of said passage so as to present a large dirt collecting area to air flowing from the mouth of the passage to the cavity, and the outer end of said mass of material being located adjacent the atmospheric end of the cavity so as to render the cavity unattractive to nest building insects.

4. In a fluid pressure brake, a valve device therefor of the type having an exhaust passage and a cavity of larger flow area than that of the passage and connecting the passage to the atmosphere and which is attractive to nest building insects, a mass of material pervious to air disposed in said cavity for preventing the entrance of insects to said passage, the inner end of said mass of material being spaced away from the mouth of said passage so as to present a large dirt collecting area to air flowing from the mouth of the passage to the cavity, and the outer end of said mass of material being located inwardly from the atmospheric end of said cavity a distance insufficient to permit an insect nest being built in the exposed portion of the cavity.

5. In a fluid pressure brake, a valve device therefor of the type having an exhaust passage and a cavity of larger flow area than that of the passage and connecting the passage to the atmosphere and which is attractive to nest building insects, a mass of material pervious to air disposed in said cavity for preventing the entrance of insects to said passage, the inner end of said mass of material being spaced away from the mouth of said passage so as to present a large dirt collecting area to air flowing from the mouth of the passage to the cavity, and the outer end of said mass of material being located close to the open atmospheric end of the cavity presenting a large exterior surface which will be unattractive to nest building insects, and means for maintaining said mass of material spaced away from the mouth of said passage.

6. In a fluid pressure brake, a valve device therefor of the type having an exhaust passage and a cavity of larger flow area than that of the passage and connecting the passage to the atmosphere and which is attractive to nest building insects, a mass of material pervious to air disposed in said cavity for preventing the entrance of insects to said passage, the inner end of said mass of material being spaced away from the mouth of said passage so as to present a large dirt collecting area to air flowing from the mouth of the passage to the cavity, and the outer end of said mass of material being located close to the open atmospheric end of the cavity presenting a large exterior surface which will be unattractive to nest building insects, means for maintaining said mass of material spaced away from the mouth of said passage, and removable means located in the atmospheric end of said cavity for maintaining said mass of material in the cavity.

7. In a fluid pressure brake, a retainer valve device comprising a casing having an exhaust passage and an exhaust cavity of large flow area connecting said passage to the atmosphere, wasp excluding means contained in said cavity and spaced away from the outlet end of said passage, screw-threads formed interiorly of said passage for attachment of a leakage test gauge, an opening in said casing through which the portion of the test gauge for attachment to said casing is adapted to be passed from the exterior of the casing, and removable means normally closing said opening.

CLYDE C. FARMER.

CERTIFICATE OF CORRECTION.

Patent No. 2,148,737. February 28, 1939.

CLYDE C. FARMER.

It is hereby certified that error appears in the printed specification of the above numbered patent requiring correction as follows: Page 2, second column, line 73, claim 1, for the word "interior" read exterior; and that the said Letters Patent should be read with this correction therein that the same may conform to the record of the case in the Patent Office.

Signed and sealed this 24th day of October, A. D. 1939.

(Seal)

Henry Van Arsdale,
Acting Commissioner of Patents.